(12) United States Patent
Kita et al.

(10) Patent No.: US 9,743,053 B2
(45) Date of Patent: Aug. 22, 2017

(54) LIGHT SOURCE APPARATUS AND IMAGE DISPLAY APPARATUS

(71) Applicant: SONY CORPORATION, Tokyo (JP)

(72) Inventors: Koji Kita, Kanagawa (JP); Yuji Manabe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/916,852

(22) PCT Filed: Aug. 8, 2014

(86) PCT No.: PCT/JP2014/004151
§ 371 (c)(1),
(2) Date: Mar. 4, 2016

(87) PCT Pub. No.: WO2015/056381
PCT Pub. Date: Apr. 23, 2015

(65) Prior Publication Data
US 2016/0198135 A1    Jul. 7, 2016

(30) Foreign Application Priority Data
Oct. 17, 2013  (JP) ................. 2013-216671

(51) Int. Cl.
*G02B 27/10* (2006.01)
*H04N 9/31* (2006.01)
(Continued)

(52) U.S. Cl.
CPC ........... *H04N 9/3161* (2013.01); *F21V 5/007* (2013.01); *F21V 9/08* (2013.01); *G02B 27/102* (2013.01);
(Continued)

(58) Field of Classification Search
CPC ...... H04N 9/31; H04N 9/3105; H04N 9/3164; G03B 21/006; G03B 21/008;
(Continued)

(56) References Cited

U.S. PATENT DOCUMENTS 6,882,379 B1 * 4/2005 Yokoyama ......... G02B 27/1033
349/5
8,840,251 B2 * 9/2014 Kuwata ............. G03B 21/2093
348/771

(Continued)

FOREIGN PATENT DOCUMENTS

CN  1273641 A   11/2000
CN  102455583 A   5/2012
(Continued)

OTHER PUBLICATIONS

International Search Report issued Nov. 11, 2014 in PCT/JP2014/004151.
(Continued)

*Primary Examiner* — William C Dowling
(74) *Attorney, Agent, or Firm* — Oblon, McClelland, Maier & Neustadt, L.L.P.

(57) ABSTRACT

A light source apparatus according to an embodiment of the present technique includes a first light source section, a second light source section, a third light source section, and a synthesis section. The first light source section includes a plurality of red laser light sources arranged in an array. The second light source section includes a plurality of green laser light sources arranged in an array. The third light source section includes a plurality of blue laser light sources arranged in an array. The synthesis section synthesizes red laser light emitted from the first light source section, green
(Continued)

laser light emitted from the second light source section, and blue laser light emitted from the third light source section to generate white light.

9 Claims, 14 Drawing Sheets

(51) Int. Cl.
| | |
|---|---|
| G03B 21/20 | (2006.01) |
| G03B 33/06 | (2006.01) |
| F21V 5/00 | (2015.01) |
| F21V 9/08 | (2006.01) |
| G02B 27/14 | (2006.01) |
| G02B 27/48 | (2006.01) |
| F21Y 103/00 | (2016.01) |
| G02B 27/09 | (2006.01) |

(52) U.S. Cl.
CPC ....... *G02B 27/1006* (2013.01); *G02B 27/141* (2013.01); *G02B 27/149* (2013.01); *G02B 27/48* (2013.01); *G03B 21/208* (2013.01); *G03B 21/2033* (2013.01); *G03B 33/06* (2013.01); *H04N 9/3138* (2013.01); *H04N 9/3152* (2013.01); *H04N 9/3164* (2013.01); *F21Y 2103/00* (2013.01); *G02B 27/0961* (2013.01); *G02B 27/0994* (2013.01)

(58) Field of Classification Search
CPC ............ G03B 21/2013; G03B 21/2033; G02B 27/10; G02B 27/0961; G02B 27/1006
See application file for complete search history.

(56) References Cited

U.S. PATENT DOCUMENTS

| | | | |
|---|---|---|---|
| 8,840,267 B2* | 9/2014 | Li | G02B 27/149 |
| | | | 362/231 |
| 9,310,033 B2* | 4/2016 | Yamada | H04N 9/3152 |
| 9,426,761 B2* | 8/2016 | Morita | H04W 56/00 |
| 2005/0083696 A1* | 4/2005 | Chiang | H04N 9/3105 |
| | | | 362/268 |
| 2005/0146652 A1 | 7/2005 | Yokoyama et al. | |
| 2005/0237488 A1 | 10/2005 | Yamasaki et al. | |
| 2005/0275762 A1* | 12/2005 | Lin | G02B 27/1026 |
| | | | 349/5 |
| 2009/0021700 A1 | 1/2009 | Matsumoto | |
| 2009/0185141 A1* | 7/2009 | Chen | G02B 27/48 |
| | | | 353/38 |
| 2014/0055755 A1* | 2/2014 | Fan | G02B 27/1033 |
| | | | 353/31 |

FOREIGN PATENT DOCUMENTS

| | | |
|---|---|---|
| CN | 102667317 A | 9/2012 |
| JP | 2000-056410 A | 2/2000 |
| JP | 2003-149594 A | 5/2003 |
| JP | 2005-300712 A | 10/2005 |
| JP | 2005-309144 A | 11/2005 |
| JP | 2008-299063 A | 12/2008 |
| JP | 2009-025512 A | 2/2009 |
| JP | 2012-048832 A | 3/2012 |
| JP | 2013-015762 A | 1/2013 |
| WO | WO99/49358 A1 | 9/1999 |

OTHER PUBLICATIONS

Office Action dated Mar. 10 2017; in Chinese Patent Appiication No. 201480055511.1 (with English-language translation).

* cited by examiner

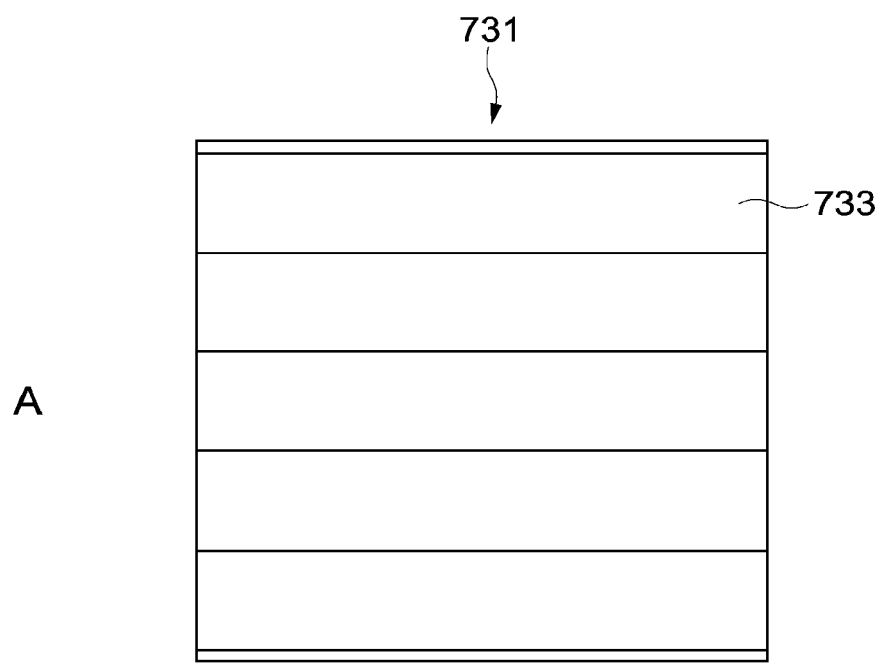
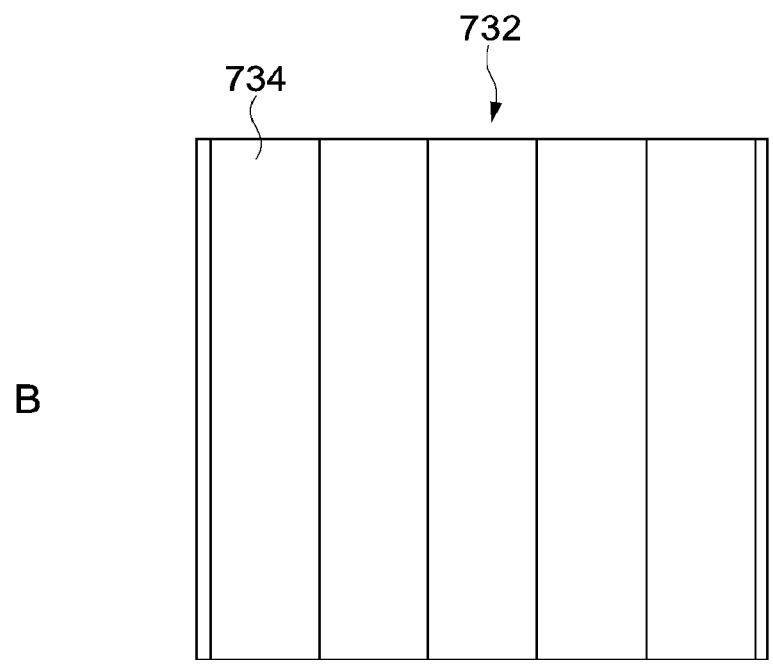
FIG.9

LIGHT SOURCE APPARATUS AND IMAGE DISPLAY APPARATUS

TECHNICAL FIELD

The present technique relates to a light source apparatus and an image display apparatus that uses the light source apparatus.

BACKGROUND ART

From the past, image display apparatuses such as a projector have been widely used. For example, light from a light source is modulated by a light modulation device such as a liquid crystal device, and the modulated light is projected onto a screen or the like to display an image. In recent years, projectors that use a laser light source as a light source are being developed. Patent Document 1 discloses a technique related to an image display apparatus that uses a laser light source.

As shown in FIG. 1 of Patent Document 1, an image display apparatus 1 includes three illumination optical systems 10 (10R, 10G, and 10B) of respective colors of RGB (red, green, and blue). As shown in FIG. 2 of Patent Document 1, each illumination optical system 10 includes a two-dimensional laser-array light source 12 that emits laser light of the respective colors, an integrator optical system 11 that uniformizes luminance of emitted laser light, and the like. The light emitted from the illumination optical systems 10 are modulated by an optical modulator 19 for the respective colors of RGB, and the modulated light are synthesized by a color synthesizing prism 4 to thus generate a color image.

Patent Document 1: Japanese Patent Application Laid-open No. 2013-15762

SUMMARY OF INVENTION

Problem to be Solved by the Invention

Regarding the image display apparatus that uses the laser light source as described above, development of a compact and highly-accurate apparatus is being desired.

In view of the circumstances as described above, the present technique aims at providing a compact and highly-accurate light source apparatus and an image display apparatus that uses the light source apparatus.

Means for Solving the Problem

To attain the object described above, according to an embodiment of the present technique, there is provided a light source apparatus including a first light source section, a second light source section, a third light source section, and a synthesis section.

The first light source section includes a plurality of red laser light sources arranged in an array.

The second light source section includes a plurality of green laser light sources arranged in an array.

The third light source section includes a plurality of blue laser light sources arranged in an array.

The synthesis section synthesizes red laser light emitted from the first light source section, green laser light emitted from the second light source section, and blue laser light emitted from the third light source section to generate white light.

In this light source apparatus, the first light source section, the second light source section, and the third light source section capable of emitting laser light of the respective colors of RGB are provided. In the light source sections, the laser light sources of the respective colors are arranged in an array. The RGB laser light emitted from the respective light source sections are synthesized by the synthesis section so that white light is generated. With this structure, luminance can be raised by appropriately setting the number of laser light sources of the light source sections, and the apparatus can thus be made compact.

The light source apparatus may further include a diffuser that receives and diffuses the white light generated by the synthesis section.

Accordingly, uniform illumination by white light can be realized.

In the first light source section, the second light source section, and the third light source section, the plurality of laser light sources of the respective colors may be arranged such that polarization directions of laser light to be emitted are aligned in one direction. In this case, the first light source section, the second light source section, and the third light source section may respectively emit the red laser light, the green laser light, and the blue laser light that have the same polarization direction to the synthesis section.

Accordingly, white light having aligned polarization direction can be generated without using a device for converting the polarization direction, and the like.

The plurality of laser light sources of the respective colors may be arranged in a first direction as a reference of the polarization direction of laser light to be emitted and a second direction orthogonal to the first direction. In this case, the plurality of red laser light sources may be arranged such that a fast axis direction of the red laser light to be emitted becomes parallel to the first direction. In addition, the plurality of green laser light sources and the plurality of blue laser light sources may be arranged such that a slow axis direction of each of the green laser light and blue laser light to be emitted becomes parallel to the first direction.

In this light source apparatus, the red laser light sources is set such that the fast axis direction of laser light becomes parallel to the first direction. On the other hand, the green laser light sources and the blue laser light sources are set such that the slow axis direction of laser light becomes parallel to the first direction. Accordingly, the polarization directions of the laser light of the respective colors that have been emitted from the respective light source sections can be made the same.

Each of the first light source section, the second light source section, and the third light source section may include a lens optical system capable of controlling a divergence angle of laser light emitted from the plurality of laser light sources of the respective colors in the fast axis direction and a divergence angle thereof in the slow axis direction. In this case, the lens optical system of the first light source section may be arranged while opposing the plurality of red laser light sources with a predetermined direction as a reference. Moreover, the lens optical systems of the second light source section and the third light source section may be arranged while respectively opposing the plurality of green laser light sources and the plurality of blue laser light sources with a direction orthogonal to the predetermined direction as a reference.

In this light source apparatus, the lens optical system is provided in each of the light source sections. The lens optical system is arranged with the predetermined direction as a reference with respect to the red laser light sources. On the other hand, the lens optical system is arranged with the direction orthogonal to the predetermined direction as a reference with respect to the green laser light sources and the blue laser light sources. Accordingly, divergence angles of laser light of the respective colors can be controlled appropriately.

The lens optical system of each of the first light source section, the second light source section, and the third light source section may include a first lens section that controls the divergence angle of laser light emitted from the plurality of laser light sources of the respective colors in the fast axis direction, and a second lens section that controls the divergence angle of the laser light in the slow axis direction.

As described above, the first lens section capable of controlling the divergence angle in the fast axis direction and the second lens section capable of controlling the divergence angle in the slow axis direction may be arranged. Accordingly, the divergence angle of laser light emitted from the light source sections can be sufficiently controlled, and a property that is easy to handle can be exerted as the light source of an image display apparatus such as a projector.

The first light source section may include a first collective lens that collects the red laser light emitted from the plurality of red laser light sources. In this case, the second light source section may include a second collective lens that collects the green laser light emitted from the plurality of green laser light sources. In addition, the third light source section may include a third collective lens that collects the blue laser light emitted from the plurality of blue laser light sources. Moreover, F numbers of the first collective lens, the second collective lens, and the third collective lens may satisfy the following expression.

$$0.8 FNoG < FNoR, FNoB < 1.2 FNoG$$

FNoR: F number of first collective lens
FNoG: F number of second collective lens
FNoB: F number of third collective lens Accordingly, the generated white light becomes easy to be handled, and an optical system or the like for uniformizing white light can be structured with ease, for example.

The F numbers of the first collective lens, the second collective lens, and the third collective lens may be the same.

Accordingly, the generated white light can be handled with ease.

According to an embodiment of the present technique, there is provided an image display apparatus including the light source apparatus, an image generation system, and a projection system.

The image generation system includes an image generation device that generates an image based on irradiated light, and an illumination optical system that irradiates the white light emitted from the light source apparatus onto the image generation device.

The projection system projects the image generated by the image generation device.

Effects of the Invention

As described above, according to the present technique, a compact and highly-accurate light source apparatus and an image display apparatus that uses the light source apparatus can be provided. It should be noted that the effects described herein are not necessarily limited, and any effect described in the specification may be obtained.

BRIEF DESCRIPTION OF DRAWINGS

FIG. 9 Schematic diagrams showing structural examples of a FAC lens and a SAC lens.

MODES FOR CARRYING OUT THE INVENTION

Hereinafter, embodiments of the present technique will be described with reference to the drawings.

First Embodiment

Figure 1:
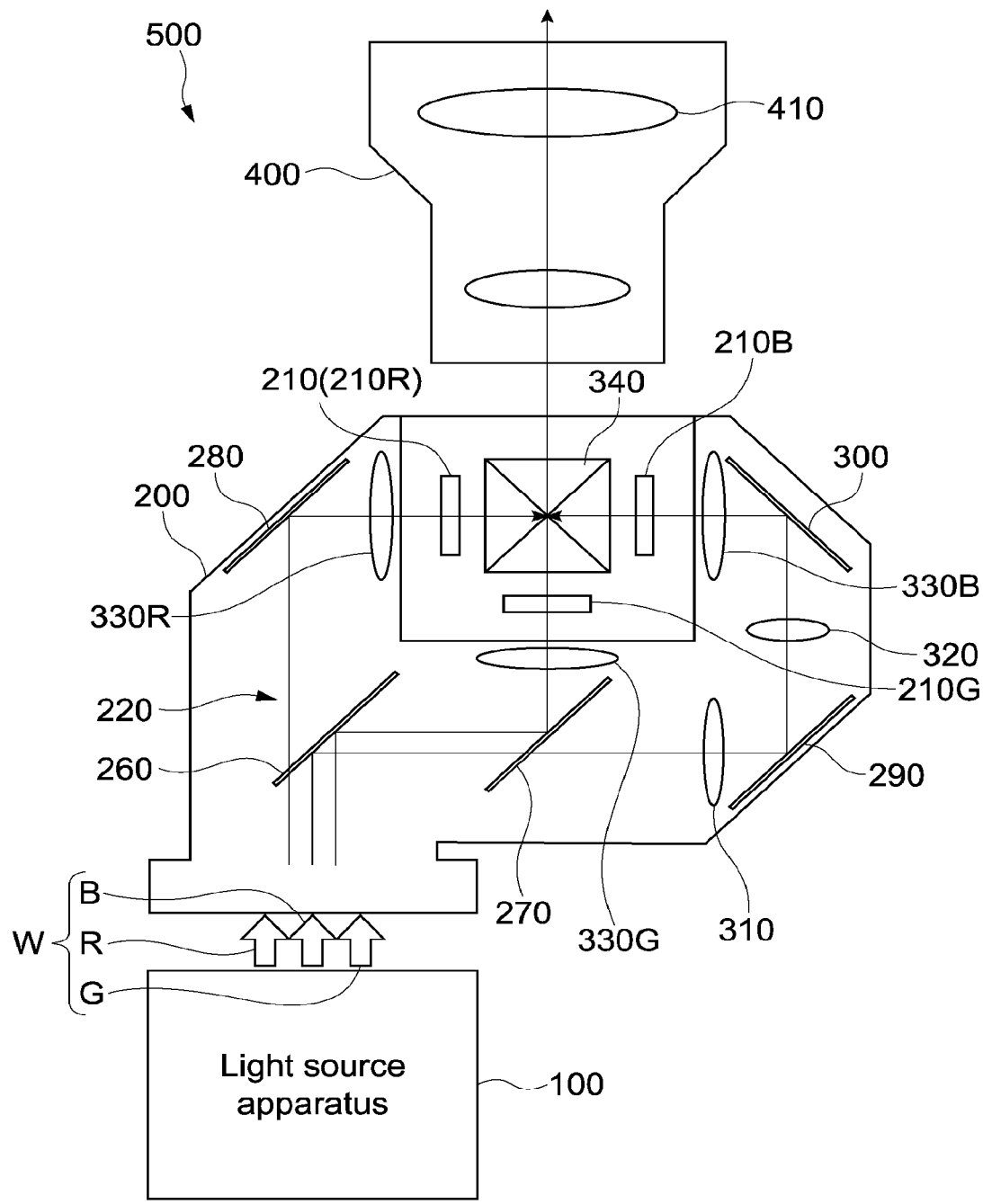
FIG. 1 A schematic diagram showing a structural example of an image display apparatus according to a first embodiment.

FIG. 1 is a schematic diagram showing a structural example of an image display apparatus according to a first embodiment of the present technique. The image display apparatus 500 is used as a projector for presentations or digital cinemas, for example. The present technique described below is also applicable to image display apparatuses for other purposes.

The image display apparatus 500 includes a light source apparatus 100 capable of emitting white light, an image generation system 200 that generates an image based on the light from the light source apparatus 100, and a projection system 400 that projects the generated image on a screen or the like (not shown).

The light source apparatus 100 emits white light W by synthesizing red laser light R of a red wavelength range, green laser light G of a green wavelength range, and blue laser light B of a blue wavelength range. The light source apparatus 100 will be described later in detail.

The image generation system 200 includes an image generation device 210 that generates an image based on irradiated light and an illumination optical system 220 that irradiates white light from the light source apparatus 100 onto the image generation device 210. The illumination optical system 220 includes dichroic mirrors 260 and 270, mirrors 280, 290, and 300, relay lenses 310 and 320, field lenses 330R, 330G, and 330B, liquid crystal light bulbs 210R, 210G, and 210B as the image generation device, and a dichroic prism 340.

The dichroic mirrors 260 and 270 have properties of selectively reflecting colored light of predetermined wavelength ranges and transmitting light of other wavelength ranges. Referring to FIG. 1, for example, the dichroic mirror 260 selectively reflects green laser light G and blue laser light B. The dichroic mirror 270 selectively reflects green laser light G out of green laser light G and blue laser light B reflected by the dichroic mirror 260. The remaining blue laser light B transmits through the dichroic mirror 270. As a result, light emitted from the light source apparatus 100 is separated into a plurality of laser light beams of different colors. It should be noted that the structures, devices to be used, and the like for separating light into a plurality of laser light beams are not limited.

The separated red laser light R is reflected by the mirror 280 and parallelized by passing through the field lens 330R, and thereafter enters the liquid crystal light bulb 210R for red laser light R modulation. The green laser light G is parallelized by passing through the field lens 330G and thereafter enters the liquid crystal light bulb 210G for green laser light G modulation. The blue laser light B is reflected by the mirror 290 via the relay lens 310 and additionally reflected by the mirror 300 via the relay lens 320. The blue laser light B reflected by the mirror 300 is parallelized by passing through the field lens 330B and thereafter enters the liquid crystal light bulb 210B for blue laser light B modulation.

The liquid crystal light bulbs 210R, 210G, and 210B are electrically connected to a signal source (e.g., PC) (not shown) that supplies image signals including image information. The liquid crystal light bulbs 210R, 210G, and 210B each modulate incident light for each pixel and generate a red-color image, a green-color image, and a blue color image based on supplied image signals of the respective colors. The modulated laser light (formed images) of the respective colors enters the dichroic prism 340 to be synthesized. The dichroic prism 340 superimposes and synthesizes the light of the respective colors that have entered from three directions and emits them toward the projection system 400.

The projection system 400 projects the image generated by the image generation device 210. The projection system 400 includes a plurality of lenses 410 and the like and irradiates light synthesized by the dichroic prism 340 onto the screen or the like (not shown). Accordingly, a full-color image is displayed.

Figure 2:
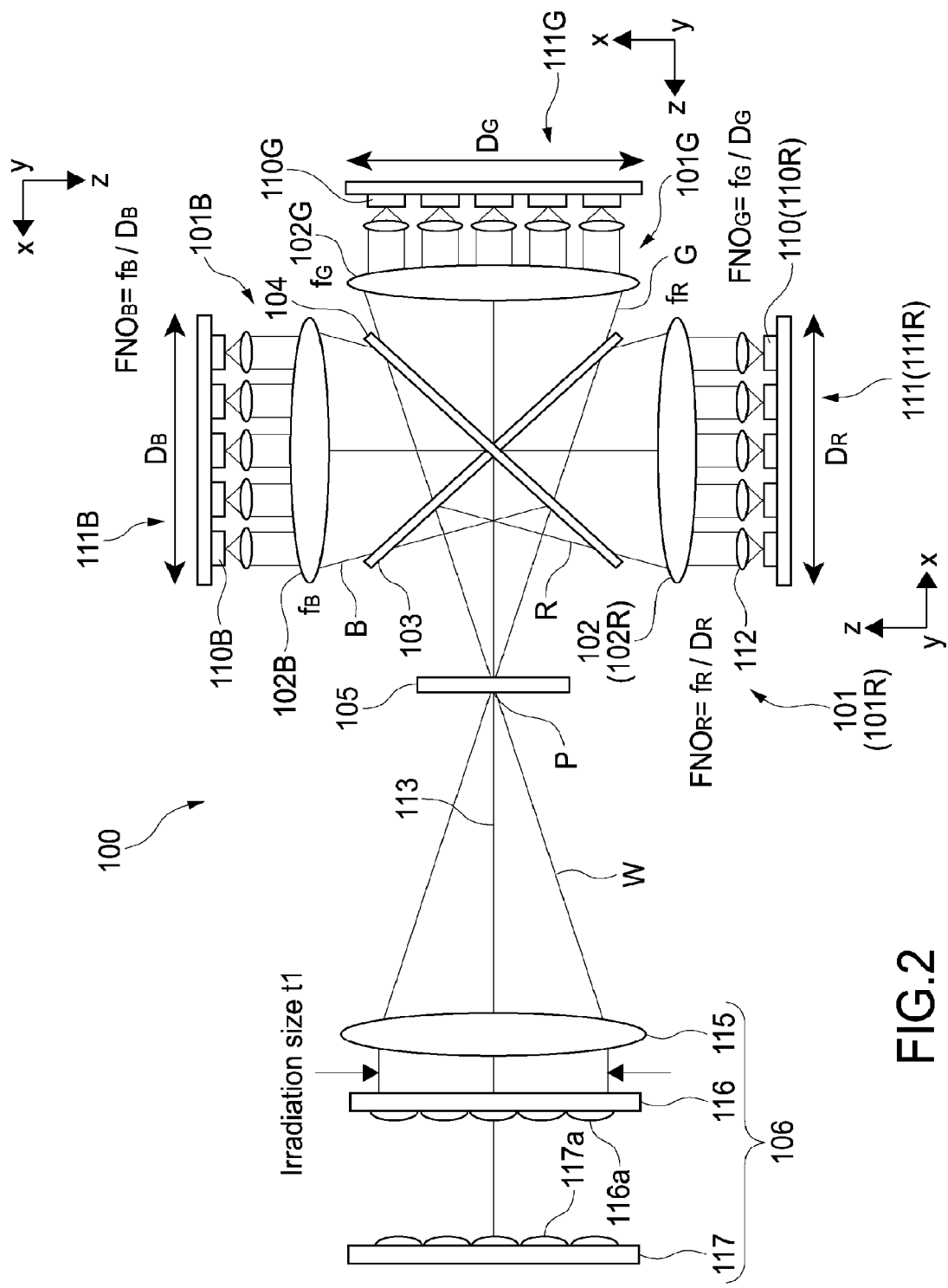
FIG. 2 A schematic diagram showing a structural example of a light source apparatus according to the first embodiment.

FIG. 2 is a schematic diagram showing a structural example of the light source apparatus 100 of this embodiment. The light source apparatus 100 includes three light source sections 101 for the respective colors of RGB, three collective lenses 102, and two dichroic mirrors 103 and 104 as a synthesis section. The light source apparatus 100 also includes a diffuser 105 and an integrator optical system 106.

The three light source sections 101 include a first light source section 101R that emits red laser light R, a second light source section 1016 that emits green laser light G, and a third light source section 101B that emits blue laser light B. The light source sections 101 each include an array light source 111 including a plurality of laser light sources 110 arranged in an array.

As shown in FIG. 2, the first light source section 101R includes an array light source 111R including a plurality of red laser light sources 110R arranged in an array. The second light source section 101G includes an array light source 111G including a plurality of green laser light sources 110G arranged in an array. The third light source section 101B includes an array light source 111B including a plurality of blue laser light sources 110B arranged in an array. It should be noted that in each of the light source sections 101, the number of laser light sources 110 arranged in an array is not limited.

The laser light sources 110 of the array light sources 111 are each a laser diode (LD) capable of oscillating laser light having a peak wavelength of an emission intensity within the wavelength range of the corresponding color. The wavelength ranges of the corresponding colors and the wavelength at which the emission intensity becomes a peak are not limited and may be set as appropriate. The laser light sources 110 each function as a light source capable of emitting laser light of a predetermined wavelength range.

As the laser light sources 110, a light source attached to a CAN package or a frame package may be used. As the CAN package or frame package, for example, a member having heat conductivity, such as copper and aluminum, is used. Accordingly, it becomes possible to prevent an influence of heat generated from the laser light sources 110. On the other hand, as the laser light sources 110, a light source in which a semiconductor laser chip is directly mounted to a predetermined holding section may be used. By using a heatsink as the holding section, heat of the laser light sources 110 can be released to the outside and the like.

Each of the light source sections 101 includes a plurality of collimator lenses 112 that substantially parallelize laser light from the plurality of laser light sources 110. The collimator lenses 112 are arranged one each with respect to the laser light sources 110. One laser light source 110 and one collimator lens 112 may be integrally structured as a unit, and such a unit may be arranged in an array.

The laser light R, G, and B of the respective colors that have been substantially parallelized by the collimator lenses 112 are collected by the three collective lenses 102. The collective lenses 102 include a first collective lens 102R, a second collective lens 102G, and a third collective lens 102B. The first collective lens 102R collects red laser light R emitted from the plurality of red laser light sources 110R. The second collective lens 102G collects green laser light G emitted from the plurality of green laser light sources 110G. The third collective lens 102B collects blue laser light B emitted from the plurality of blue laser light sources 110B.

The laser light collected by the collective lenses 102 are synthesized by the two dichroic mirrors 103 and 104 to generate white light W. In other words, in this embodiment, by the dichroic mirrors 103 and 104 functioning as the synthesis section, the red laser light R emitted from the first light source section 101R, the green laser light G emitted from the second light source section 101G, and the blue laser light B emitted from the third light source section 101B are synthesized to generate white light W.

As shown in FIG. 2, in this embodiment, the dichroic mirrors 103 and 104 are arranged on a straight line as an optical axis 113 of the white light W. Of the circumference of the dichroic mirrors 103 and 104, the light source sections 101 and the collective lenses 102 are arranged in the circumference in three directions excluding a side on which the optical axis 113 extends toward the integrator optical system 106.

The light source sections 101 are arranged such that the laser light is emitted toward the dichroic mirrors 103 and 104. In which of the three directions surrounding the dichroic mirrors 103 and 104 the light source section 101 of what color is to be arranged is not limited. Further, as long as laser light R, B, and B of the three colors are emitted to the dichroic mirrors 103 and 104, the positions of the light source sections 101 may also be set arbitrarily.

By the dichroic mirror 103, the red laser light R emitted from the first light source section 101R is reflected, and the green laser light G and blue laser light B respectively emitted from the second light source section 101G and the third light source section 101B are transmitted therethrough. Further, by the dichroic mirror 104, the blue laser light B emitted from the third light source section 101B is reflected, and the green laser light G and red laser light R respectively emitted from the second light source section 101G and the first light source section 101R are transmitted therethrough. Accordingly, white light W is emitted along the same optical axis 113.

As the synthesis section that generates white light W by synthesizing laser light R, G, and B of the respective colors, other optical members such as a dichroic prism may be used in place of the two dichroic mirrors 103 and 104.

Regarding the three collective lenses 102R, 102G, and 102B, the outer shape, focal distance, and the like are designed as appropriate so that F numbers (F values) become substantially equal in this embodiment. Accordingly, as shown in FIG. 2, the three laser light beams R, G, and B are collected at substantially the same position. As a result, white light W is collected at the position P. It should be noted that the laser light of the respective colors may be collected by a plurality of lenses that function as a collective section instead of a single collective lens 102. Also in this case, the F numbers only need to be calculated based on the focal distance of the collective section.

The diffuser 105 contributes to suppression of speckles as a phenomenon unique to laser light on a screen and realization of uniform illumination. The diffuser 105 receives and diffuses the white light W synthesized and generated by the dichroic mirrors 103 and 104. For example, as the diffuser 105, a transmission-type base material in which minute concavities and convexities are formed is used while being displaced at a high frequency. A diffuser 105 having an arbitrary structure may also be used. As shown in FIG. 2, the diffuser 105 is arranged in the vicinity of the position P at which white light W is collected. For example, white light W that has entered the diffuser 105 that is displaced by a drive apparatus or the like is diffused herein to exit. Accordingly, suppression of speckles or the like is realized.

The integrator optical system 106 includes a parallelization lens 115, a first fly-eye lens 116, and a second fly-eye lens 117. The parallelization lens 115 substantially parallelizes white light W collected by the collective lens 102 again and irradiates it onto the first fly-eye lens 116.

The parallelization lens 115 is arranged such that the focal position substantially matches the position P at which the white light W is collected. Accordingly, the light flux that enters the first fly-eye lens 116 spreads uniformly across the entire effective area of the first fly-eye lens 116. Moreover, as described above, the three collective lenses 102R, 102G, and 102B collect the white light W at the position P with substantially the same F number. Consequently, light fluxes of laser light R, G, and B of the respective colors that enter the first fly-eye lens 116 also substantially match.

The first fly-eye lens 116 and the second fly-eye lens 117 respectively include a plurality of two-dimensionally arranged micro-lenses 116a and 117a. The plurality of micro-lenses 116a of the first fly-eye lens 116 and the plurality of micro-lenses 117a of the second fly-eye lens 117 are arranged in correspondence with one another.

The white light W substantially parallelized by the parallelization lens 115 is split into a plurality of light fluxes by the micro-lenses 116a of the first fly-eye lens 116 and imaged by the micro-lenses 117a of the second fly-eye lens 117. Each of the micro-lenses 117a of the second fly-eye lens 117 functions a secondary light source to irradiate white light W onto the image generation system 200.

The integrator optical system 106 has, as a whole, a function of making incident light that is irradiated onto the liquid crystal light bulbs 210R, 210G, and 210B a uniform luminance distribution. The structure of the integrator optical system 106 is not limited and may be designed as appropriate. Further, other optical members such as a collective lens and a condenser lens may be used in addition to the members shown in FIG. 2.

By using the diffuser 105, the integrator optical system 106, and the like, spatial coherences of laser are suppressed to suppress speckles, and an optical intensity distribution is also made uniform. Accordingly, it becomes possible to project a highly-accurate color image.

Here, the F numbers of the collective lenses 102 will be described in detail. The F number of the first collective lens 102R is represented by $FNO_R$, the F number of the second collective lens 102G is represented by $FNO_G$, and the F number of the third collective lens 102B is represented by $FNO_B$. Accordingly, the F numbers can be respectively obtained by the following expressions based on the focal distances f of the collective lenses 102 and effective sizes (light irradiation areas) D of the array light sources 111.

$$FNO_R = f_R/D_R$$

$$FNO_G = f_G/D_G$$

$$FNO_B = f_B/D_B$$

$f_R$ = focal distance of first collective lens 102R
$f_G$ = focal distance of second collective lens 102G
$f_B$ = focal distance of third collective lens 102B
$D_R$: effective size of array light source 111R
$D_G$: effective size of array light source 111G
$D_B$: effective size of array light source 111B When the F numbers vary, the positions at which the laser light is collected also vary. As a result, the irradiation size t1 of light fluxes irradiated onto the first fly-eye lens 116 after being substantially parallelized by the parallelization lens 115 also varies. When the F number is small, the irradiation size t1 becomes large, with the result that the amount of light that does not fit in the effective range of the first fly-eye lens 116 increases, and optical losses increase. When the F number is large, the irradiation size t1 becomes small, with the result that the number of lenses that are irradiated with light out of the plurality of micro-lenses 116a of the first fly-eye lens 116 is reduced. Consequently, optical uniformity is lowered.

Therefore, the F numbers of the collective lenses 102 are set as appropriate such that light is irradiated onto the first fly-eye lens 116 at an appropriate irradiation size t1. Further, as described above, the F numbers are set to be substantially the same.

In this embodiment, with the F number of the second collective lens 102G being a reference, the F numbers are set so as to satisfy the following expression.

$$0.8 FNoG < FNoR, FNoB < 1.2 FNoG$$

Specifically, the F numbers of the first collective lens 102R and the third collective lens 102B are set to fall within the range of the above expression.

By setting the F numbers within such a range, the laser light R, G, and B were appropriately irradiated within the effective range of the first fly-eye lens 116. As a result, the synthesized white light W was appropriately irradiated within the effective range of the first fly-eye lens 116.

Specifically, by setting the F numbers to satisfy the expression above, it becomes possible to collect the laser light R, G, and B at substantially the same position and collect the white light W at a predetermined position. Therefore, the generated white light W can be handled with ease, and an optical system or the like for uniformizing the white light W, such as the integrator optical system 106, can be structured with ease.

Of course, the F numbers of the first collective lens 102R, the second collective lens 102G, and the third collective lens 102B may be set to be same. Moreover, as long as the white light W can be collected at a predetermined position, the F numbers may be set as appropriate without being limited to the case of satisfying the expression above.

Next, the polarization directions of the laser light R, G, and B emitted from the respective array light sources 111 will be described. Linearly-polarized laser light is emitted from each of the laser light sources 110 of this embodiment. When arranging the plurality of laser light sources 110 in an array, the plurality of laser light sources 110 are arranged such that the polarization directions of laser light to be emitted are aligned in one direction. Accordingly, laser light R, G, and B emitted from the respective array light sources 111 also become linearly-polarized light.

Further, in this embodiment, by the first light source section 101R, the second light source section 101G, and the third light source section 101B, the red laser light R, the green laser light G, and the blue laser light B having the same polarization direction exit toward the dichroic mirrors 103 and 104. Accordingly, it becomes possible to generate white light W having an aligned polarization direction without using a device for converting a polarization direction, such as a P/S conversion device. When the light modulation device for generating an image is of a type that modulates a polarization such as a liquid crystal light bulb, the polarization direction of white light W is set to coincide with the polarization direction of the light modulation device. Accordingly, light use efficiency can be improved.

In this embodiment, laser light that oscillates in the y direction shown in FIG. 2 is emitted from each of the light source sections 101. Specifically, laser light R, G, and B having polarization directions in the y direction are irradiated onto the dichroic mirrors 103 and 104. Then, white light W having the polarization direction in the same y direction is generated and emitted toward the integrator optical system 106. It should be noted that the polarization directions of laser light are not limited to the y direction shown in FIG. 2. The polarization directions of the respective laser light may be aligned in the x direction or in other directions.

Figure 3:
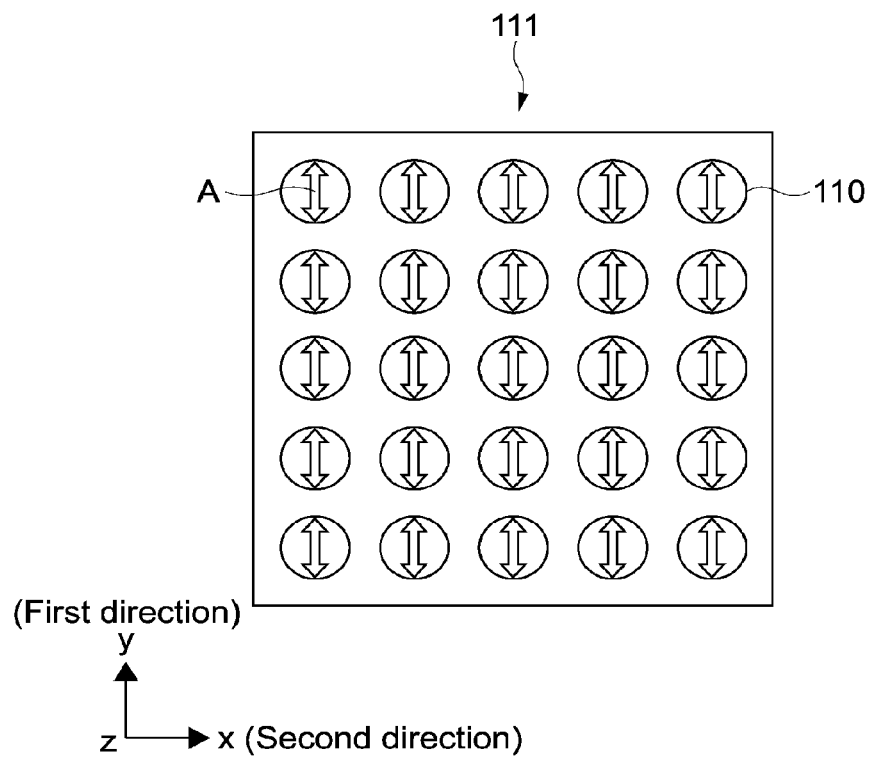
FIG. 3 A schematic diagram showing a plurality of laser light sources arranged in an array.

FIG. 3 is a schematic diagram showing the plurality of laser light sources 110 arranged in an array. The figure corresponds to a diagram that sees the array light sources 111 from the dichroic mirrors 103 and 104 side. Moreover, the xyz coordinates shown in FIG. 3 correspond to the zyx coordinates shown in FIG. 2.

As described above, in this embodiment, the polarization directions of laser light emitted from the respective light source sections 101 are set in the y direction. In this embodiment, the y direction is a first direction that is a reference of the polarization directions of laser light to be emitted. Further, the x direction corresponds to a second direction orthogonal to the first direction.

As shown in FIG. 3, the plurality of laser light sources 110 are arranged in an array along the first direction (y direction) and the second direction (x direction). Moreover, the plurality of laser light sources 110 are arranged such that the polarization direction of laser light to be emitted from each of the laser light sources 110 (arrows A) becomes parallel to the first direction.

As described above, in this embodiment, the plurality of laser light sources 110 are arranged in an array along the second direction so that one of the two orthogonal directions becomes the polarization direction. In addition, orientations of the array light sources 111 are adjusted as appropriate so that the polarization direction of laser light to be emitted is set in a predetermined direction in the light source apparatus 100.

Figure 4:
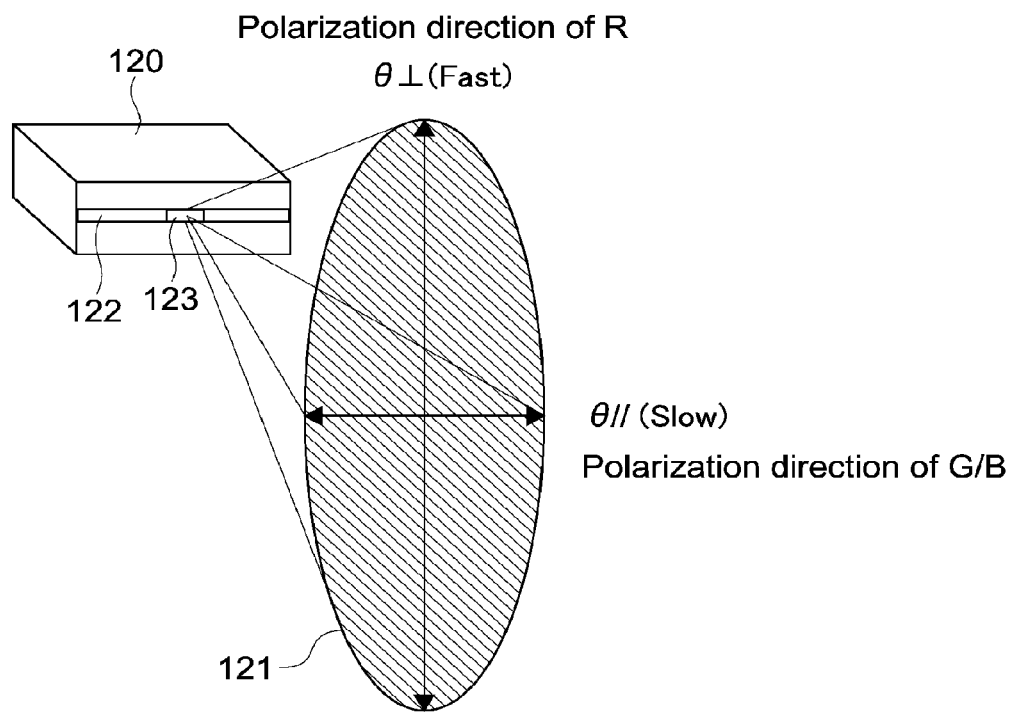
FIG. 4 A diagram for explaining a fast axis and slow axis of laser light.

FIG. 4 is a diagram for explaining a fast axis and slow axis of laser light emitted from the laser light sources 110. As shown in FIG. 4, emission light from a semiconductor laser generally has a long-oval-shaped light distribution 121. For example, assuming that a surface direction of an active layer 122 of a laser chip 120 is a horizontal direction as a matter of convenience, the light distribution 121 of laser light emitted from a luminous point 123 becomes a long oval shape that is elongated in the vertical direction. As shown in FIG. 4, the long-axis direction of the light distribution 121 becomes the fast axis direction, and the short-axis direction becomes the slow axis direction.

In this embodiment, the red laser light sources 110R that emit red laser light R that oscillates in the fast axis direction are used. In addition, the green laser light sources 110G that emit green laser light G that oscillates in the slow axis direction and the blue laser light sources 110B that emit blue laser light B that also oscillates in the slow axis direction are used. Therefore, the polarization direction of the red laser light R becomes equal to the fast axis direction. Moreover, the polarization directions of the green laser light G and blue laser light B also become equal to the slow axis direction.

Figure 5:
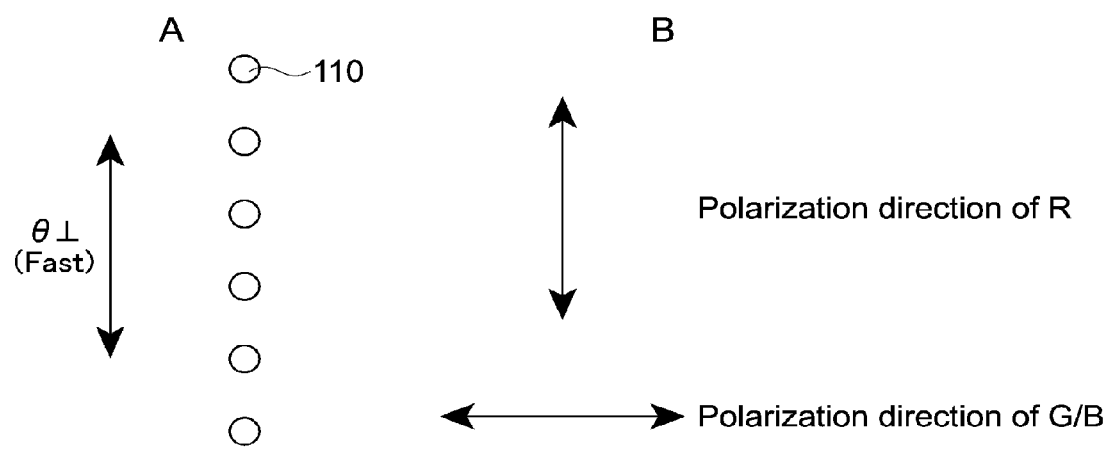
FIG. 5 Diagrams showing a relationship among the fast axis and slow axis of laser light and a polarization direction.

As a result, for example, assuming that the plurality of laser light sources 110 are arranged in one line along the fast axis direction such that the fast axis directions match as shown in FIG. 5A, the polarization direction of the red laser light R becomes a direction parallel to the fast axis direction as shown in FIG. 5B. On the other hand, the polarization directions of the green laser light G and the blue laser light B become a direction orthogonal to the fast axis direction (slow axis direction).

Figure 6:
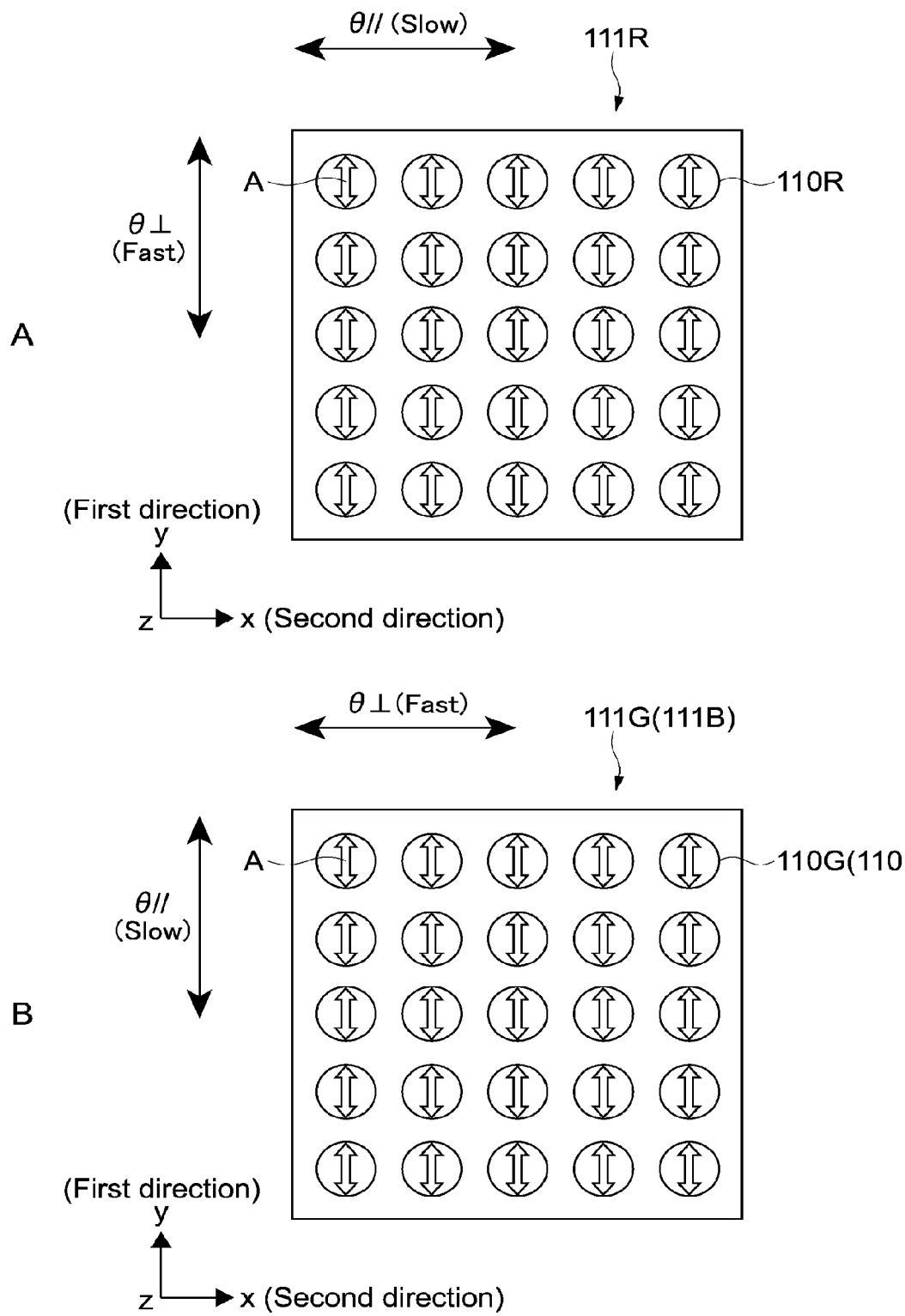
FIG. 6 Schematic diagrams showing arrangements of the plurality of laser light sources in the respective array light sources.

FIG. 6 are schematic diagrams showing arrangements of the plurality of laser light sources 110 in the respective array light sources 111. The plurality of laser light sources 110 are arranged as shown in FIGS. 6A and 6B based on a relationship among the fast axis direction and slow axis direction described above and the polarization direction of laser light. Specifically, the plurality of red laser light sources 110R are arranged such that the fast axis direction of red laser light R to be emitted becomes parallel to the y direction as the first direction (FIG. 6A). On the other hand, the plurality of green laser light sources 110G and the plurality of blue laser light sources 110B are arranged such that the slow axis direction of green laser light G and blue laser light B to be emitted becomes parallel to the y direction as the first direction. Accordingly, the polarization directions of laser light to be emitted from the laser light sources 110 (arrows A) can be made the same.

It should be noted that the red laser light sources 110R having polarization directions in the slow axis direction may be used instead. As the red laser light sources 110R, a light source having a polarization direction in the fast axis direction and a light source having a polarization direction in the slow axis direction may both be present. For example, a wavelength range, a peak wavelength, or the like is considered as one of the factors that define the polarization direction. When the red laser light sources 110R having the polarization direction in the slow axis direction are used, the laser light sources 110 of the respective colors of RGB only need to be arranged such that the slow axis direction of laser light to be emitted becomes parallel to the y direction as the first direction.

Also regarding the green laser light sources 110G and the blue laser light sources 110B, when there are light sources having polarization directions in the fast axis direction, the fast axis direction only needs to be aligned in the first direction as a reference of the polarization direction as appropriate. In other words, in the laser light sources 110 of the respective colors, the axis direction as the polarization direction only needs to be set so as to be parallel to the first direction.

Heretofore, in the image display apparatus 500 and light source apparatus 100 of this embodiment, the first light source section 101R, the second light source section 101G, and the third light source section 101B capable of emitting laser light of the respective colors of RGB are provided. In each of the light source sections 101, the laser light sources 110 of the respective colors are arranged in an array. The RGB laser light emitted from the respective light source sections 101 are synthesized by the dichroic mirrors 103 and 104 to generate white light W. With such a structure, luminance can be raised by appropriately setting the number of laser light sources 110 of the light source sections 101, and the light source apparatus 100 can thus be made compact.

In recent years, in image display apparatuses such as a projector, more light sources are being provided as semiconductors. Although luminous tubes such as a mercury lamp and a xenon lamp have been used from the past, solid-state light sources (semiconductor laser, LED) have been attracting attention for their advantages in longer lifetimes, smaller risk of burst, higher usability regarding lighting and extinction, and the like than the luminous tubes. Based on such a background, with the structure of the present technique described above, it becomes possible to raise power of the light sources and secure sufficient brightness. It also becomes possible to realize a compact light source apparatus and image display apparatus.

Second Embodiment

A light source apparatus according to a second embodiment of the present technique will be described. In the descriptions below, descriptions on structures and operations that are the same as those of the light source apparatus 100 described in the above embodiment will be omitted or simplified.

Figure 7:
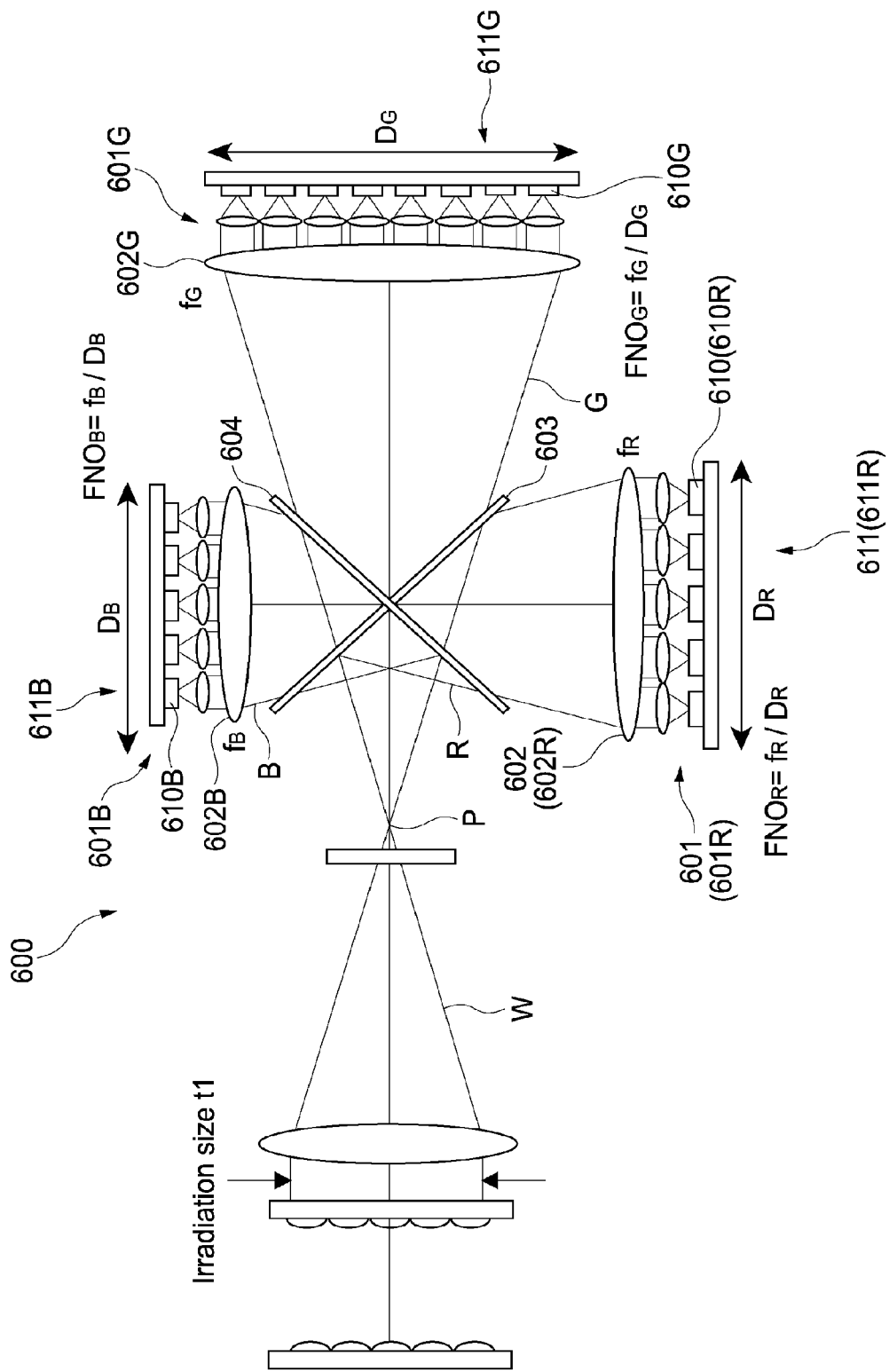
FIG. 7 A schematic diagram showing a structural example of a light source apparatus according to a second embodiment.

FIG. 7 is a schematic diagram showing a structural example of a light source apparatus 600 of this embodiment. In the light source apparatus 600, the number of laser light sources 610 to be arranged and an effective size of array light sources 611 are set for each color in a first light source section 601R, a second light source section 601G, and a third light source section 601B. Regarding the effective sizes of the array light sources 611, the effective area of the array light source 611G that emits green laser light G is the largest, and the effective area of the array light source 611B that emits blue laser light B is the smallest. The array light source 611R that emits red laser light R has an intermediate size.

Regarding the number of laser light sources 610 arranged in the array light sources 611, the number of red laser light sources 610R and the number of blue laser light sources 610B are the same. The number of green laser light sources 610G is larger than those of other colors. As described above, the size of the array light sources 611 and the number of laser light sources 610 to be mounted may differ for each color of RGB.

The number of laser light sources 610 (semiconductor chips) is determined based on the power or wavelength of laser light that can be emitted from the individual chips, requisite color coordinates on a screen onto which an image is to be projected, and the like. Moreover, power requisite for generating desired white light W also differs for each color in many cases. Based on those points, the number of laser light sources 610 and the size of the array light sources 611 may be set as appropriate for each color.

As shown in FIG. 7, distances between the respective light source sections 601 and the synthesis section are also set as appropriate for each color so that light fluxes of light emitted to dichroic mirrors 603 and 604 functioning as the synthesis section become substantially the same.

Also when the structure of the light source section 601 is set for each color, white light W can be collected at the predetermined position P by appropriately setting an F number of a first collective lens 602R, an F number of a second collective lens 602G, and an F number of a third collective lens 602B as described in the first embodiment.

Third Embodiment

Figure 8:
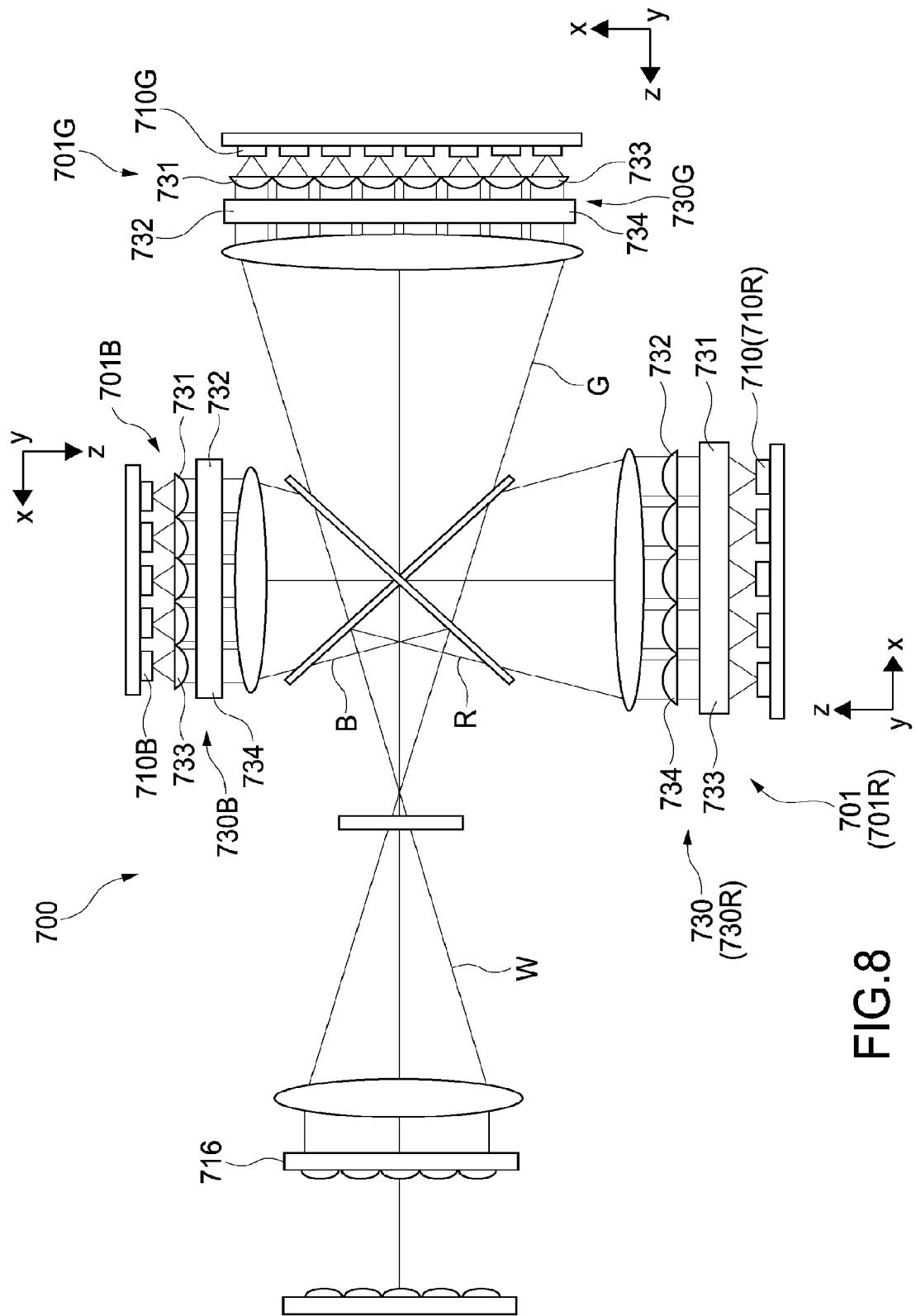
FIG. 8 A schematic diagram showing a structural example of a light source apparatus according to a third embodiment.

FIG. 8 is a schematic diagram showing a structural example of a light source apparatus 700 of this embodiment. In the light source apparatus 700, a lens optical system 730 is provided in place of the plurality of collimator lenses in each light source section 701. The lens optical system 730 is capable of controlling divergence angles of laser light emitted from a plurality of laser light sources 710 of the respective colors, in the fast axis direction and the slow axis direction.

The lens optical system 730 of each of the first light source section 701R, the second light source section 701G, and the third light source section 701B includes a FAC (First Axis Collimator) lens 731 that controls a divergence angle of laser light emitted from the plurality of laser light sources 710 of the respective colors in the fast axis direction. The FAC lens 731 corresponds to the first lens section in this embodiment. The FAC lens 731 substantially parallelizes the fast axis component of laser light emitted from the laser light sources 710.

The lens optical system 730 of each of the first light source section 701R, the second light source section 701G, and the third light source section 701B includes a SAC (Slow Axis Collimator) lens 732 that controls the divergence angle of laser light emitted from the plurality of laser light sources 710 of the respective colors in the slow axis direction. The SAC lens 732 corresponds to the second lens section in this embodiment. The SAC lens 732 substantially parallelizes the slow axis component of laser light emitted from the laser light sources 710.

FIG. 9 are schematic diagrams showing structural examples of the FAC lens 731 and the SAC lens 732. FIG. 9A is a schematic diagram showing the structural example of the FAC lens 731, and FIG. 9B is a schematic diagram showing the structural example of the SAC lens 732.

As shown in FIG. 9A, a lens array in which a plurality of cylindrical lenses 733 are integrally formed while being arranged in an array is used as the FAC lens 731. Similarly, as shown in FIG. 9B, a lens array in which a plurality of cylindrical lenses 734 are integrally formed while being arranged in an array is used as the SAC lens 732.

The curvature radius of the lens surface of each of the cylindrical lenses 733 and 734, and the like may be set as appropriate. In the FAC lens 731 shown in FIG. 9A, the extension direction of each of the cylindrical lenses 733 is set in the slow axis direction of laser light emitted from the laser light sources 710. In the SAC lens 732 shown in FIG. 9B, the extension direction of each of the cylindrical lenses 734 is set in the fast axis direction of laser light emitted from the laser light sources 710. Therefore, the FAC lens 731 and the SAC lens 732 are arranged such that the extension directions of the cylindrical lenses 733 and the cylindrical lenses 734 become orthogonal to one another.

In the light source apparatus 700 shown in FIG. 8, the laser light sources 710 of each of the light source sections 701 are arranged similar to those of the first embodiment. In other words, the plurality of red laser light sources 710R are arranged such that the fast axis direction of red laser light R to be emitted becomes parallel to the y direction (FIG. 6A). On the other hand, the plurality of green laser light sources 710G and the plurality of blue laser light sources 710B are arranged such that the slow axis direction of green laser light G and blue laser light B to be emitted becomes parallel to the y direction.

Therefore, as shown in FIG. 8, in the first light source section 701R, the FAC lens 731 is arranged such that the extension direction of the cylindrical lenses 733 becomes parallel to the x direction. In addition, the SAC lens 732 is arranged such that the extension direction of the cylindrical lenses 734 becomes parallel to the y direction. On the other hand, in the second light source section 701G and the third light source section 701B, the FAC lens 731 is arranged such that the extension direction of the cylindrical lenses 733 becomes parallel to the y direction. In addition, the SAC lens 732 is arranged such that the extension direction of the cylindrical lenses 734 becomes parallel to the x direction.

In other words, the orientation of the lens optical system 730R of the first light source section 701R and the orientations of the lens optical systems 730G and 730B of the second light source section 701G and the third light source section 701B with respect to the plurality of laser light sources 710 differ 90°. Specifically, the lens optical system 730R is arranged while being rotated 90° from the lens optical systems 730G and 730B.

Here, the expression "the lens optical system is arranged with a predetermined direction as a reference" means that "the lens optical system is arranged while setting the arrangement direction of the lens optical system in the predetermined direction". The "arrangement direction of the lens optical system" may be set as appropriate, but the extension direction of the cylindrical lenses 734 of the SAC lens 732 is set as the "arrangement direction of the lens optical system" herein. Of course, the extension direction of the cylindrical lenses 733 of the FAC lens 731 may be set as the "arrangement direction of the lens optical system", or other directions may be set.

As a result, in the example shown in FIG. 8, the lens optical system 730R of the first light source section 701R is arranged while opposing the plurality of red laser light sources 710R with a predetermined direction, that is the y direction as one of the directions in which the plurality of red laser light sources 710R are arranged, being a reference. On the other hand, the lens optical systems 730G and 730B of the second light source section 701G and the third light source section 701B are respectively arranged while opposing the plurality of green laser light sources 710G and the plurality of blue laser light sources 710B with a direction orthogonal to the predetermined direction (x direction) being a reference. Consequently, by the lens optical systems 730, the divergence angles of laser light of the respective colors in the fast axis direction and the slow axis direction can be controlled appropriately.

Figure 10:
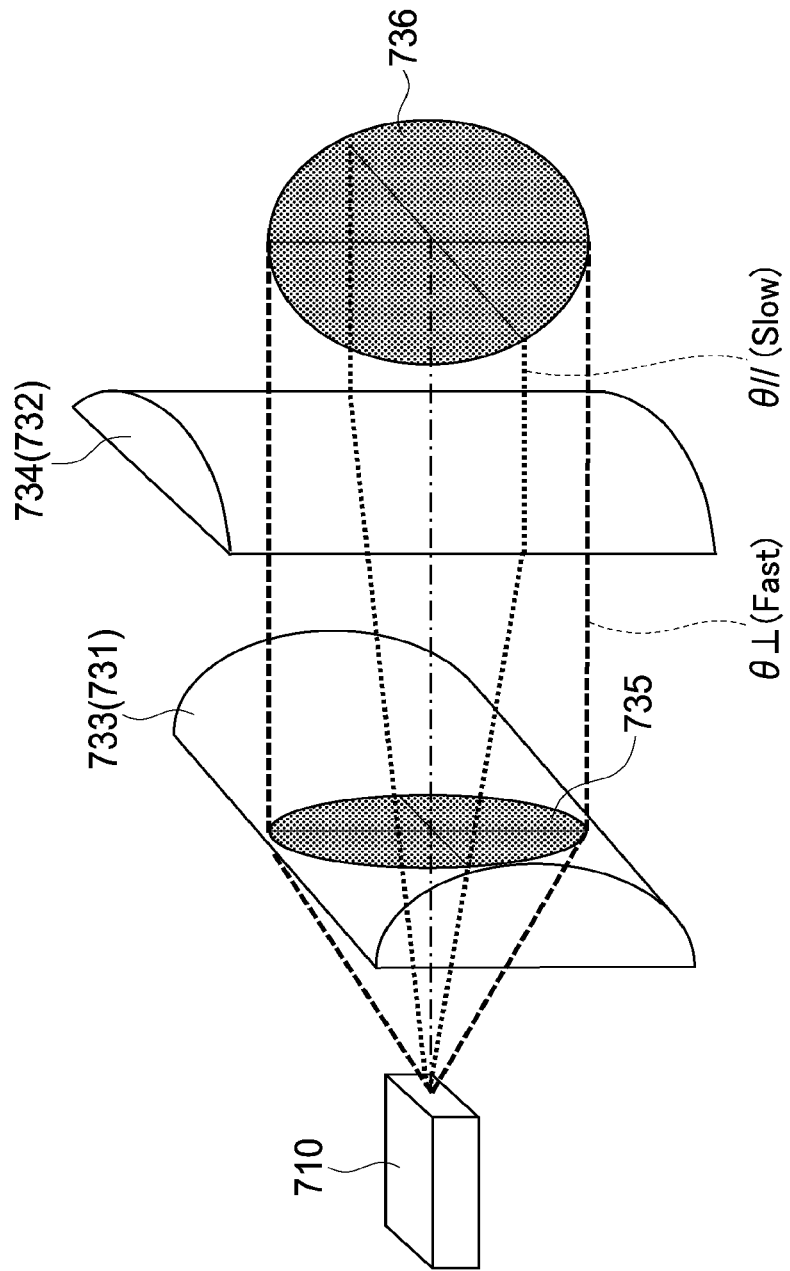
FIG. 10 A diagram for explaining substantial parallelization of laser light using the FAC lens and the SAC lens.
Figure 11:
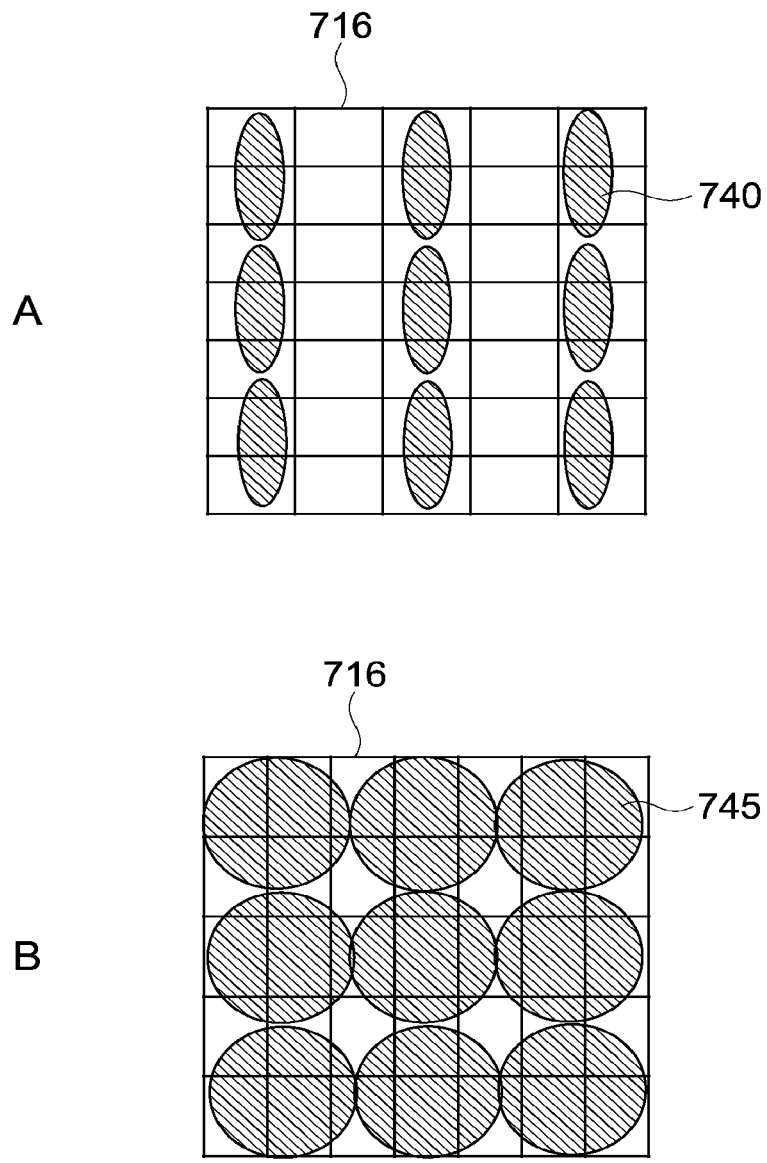
FIG. 11 Diagrams for explaining the substantial parallelization of laser light using the FAC lens and the SAC lens.

FIGS. 10 and 11 are diagrams for explaining substantial parallelization of laser light using the FAC lens 731 and the SAC lens 732. To simplify the illustrations of the figures, in FIG. 10, substantial parallelization of one laser light source 710 is illustrated. In each of the laser light sources 710, substantial parallelization of the fast axis component and that of the slow axis component are carried out similarly.

The cylindrical lens 733 of the FAC lens 731 and the cylindrical lens 734 of the SAC lens 732 are sequentially arranged with respect to the laser light source 710. By synthesizing the two cylindrical lenses 733 and 734, a beam shaping function as follows is exerted.

Laser light emitted from the laser light source 710 enters the cylindrical lens 733 in a long oval shape as indicated by a light distribution 735. The light in a long diameter direction of the long oval shape (fast axis component) is substantially parallelized and emitted by the cylindrical lens 733. On the other hand, the light in a short diameter direction of the long oval shape (short axis component) proceeds as it is while expanding and enters the cylindrical lens 734. By the cylindrical lens 734, the light in the short diameter direction of the long oval shape is substantially parallelized to be emitted.

As shown in FIG. 10, the laser light emitted from the cylindrical lens 734 is shaped into a substantial circle as indicated by a light distribution 736. As a result, a property that is easy to handle can be obtained as the light source of the image display apparatus such as a projector.

FIG. 11 are schematic diagrams of a first fly-eye lens 716 seen from the optical axis side. When laser light is not beam-shaped by the lens optical system 730, long-oval-shaped light 740 enters the first fly-eye lens 716 as it is as shown in FIG. 11A. As a result, the bias of the light distribution in the first fly-eye lens 716 becomes large to highly likely cause brightness unevenness or color unevenness of an image on a screen.

On the other hand, when laser light is beam-shaped by the lens optical system 730 as in this embodiment, the substantially-circular light 745 enters the first fly-eye lens 716 as shown in FIG. 11B. As a result, the bias of the light distribution in the first fly-eye lens 716 can be relieved, and brightness unevenness or color unevenness of an image on a screen can be suppressed to improve quality. Moreover, by defocusing the FAC lens 731 and the SAC lens 732, the divergence angle of emission light can be adjusted freely.

Other Embodiments

The present technique is not limited to the embodiments described above, and various other embodiments can also be realized.

FIGS. 12 to 15 are schematic diagrams showing structural examples of a light source apparatus according to other embodiments. The light source apparatus 800 shown in FIG. 12 differs in the structures of dichroic mirrors 803 and 804 functioning as the synthesis section. In above embodiments, the two dichroic mirrors are arranged while crossing each other. In this embodiment, the two dichroic mirrors 803 and 804 are set apart from each other.

Figure 12:
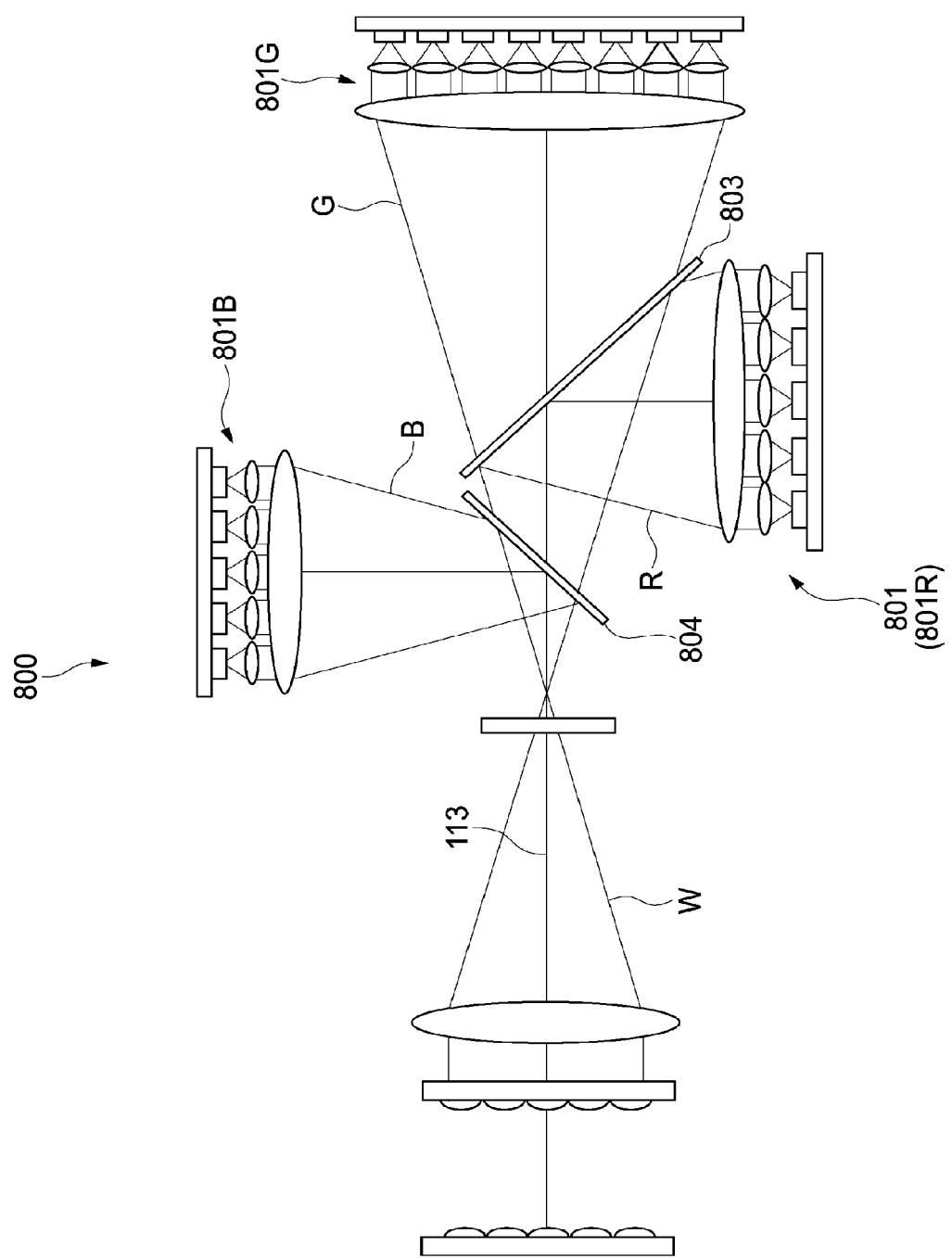
FIG. 12 A schematic diagram showing a structural example of a light source apparatus according to another embodiment.

As shown in FIG. 12, the dichroic mirrors 803 and 804 are set apart from each other on a straight line as the optical axis 113 of white light. A second light source section 801G that emits green laser light G is arranged on the straight line. A first light source section 801R is arranged at a position at which red laser light R can be emitted toward the dichroic mirror 803 that reflects red laser light R. A third light source section 801B is arranged at a position at which blue laser light B can be emitted toward the dichroic mirror 804 that reflects blue laser light B.

Even with such a structure, the red laser light R, the green laser light G, and the blue laser light B are synthesized appropriately by the dichroic mirrors 803 and 804. In addition, white light W can be emitted along the same optical axis 113. Other structures of the synthesis section may be set as appropriate.

Figure 13:
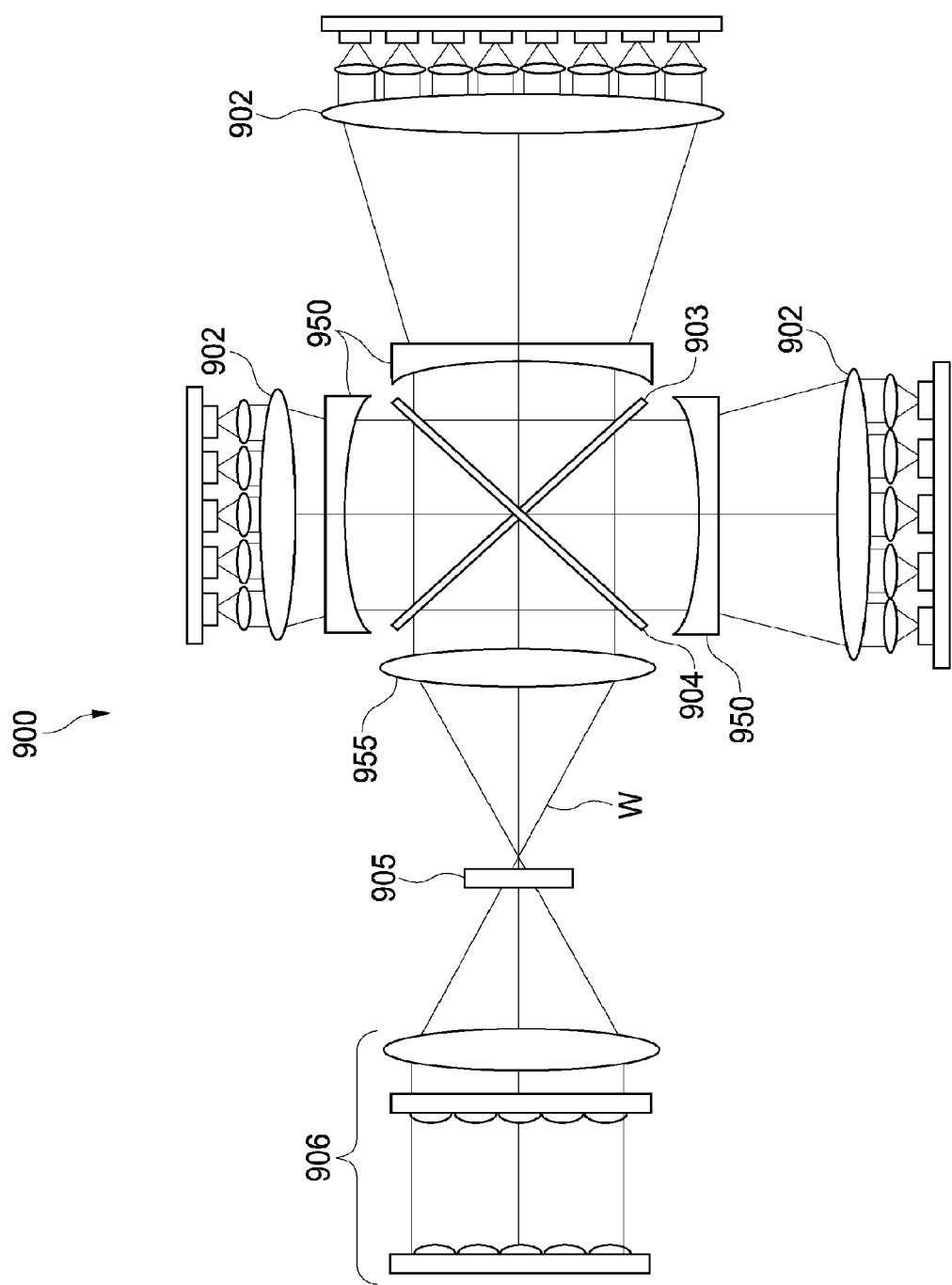
FIG. 13 A schematic diagram showing a structural example of a light source apparatus according to another embodiment.

In a light source apparatus 900 shown in FIG. 13, concave lenses 950 are arranged respectively between three collective lenses 902 and dichroic mirrors 903 and 904. In addition, a collective lens 955 is arranged between the dichroic mirrors 903 and 904 and a diffuser 905. Laser light of the respective colors collected by the three collective lenses 902 are substantially parallelized again by the concave lenses 950 and emitted toward the dichroic mirrors 903 and 904. The sizes of light fluxes of laser light of the respective colors emitted from the concave lenses 950 are set to substantially match with one another.

The white light W emitted from the dichroic mirrors 903 and 904 is collected again by the collective lens 955 and emitted toward the diffuser 905. Then, the white light W that has transmitted through the diffuser 905 is emitted toward an integrator optical system 906. In this embodiment, the synthesis of the laser light of the respective colors on the same optical axis by the dichroic mirrors 903 and 904 is performed while the respective laser light are substantially parallelized. Accordingly, incident angle dependency conditions of spectral properties of the dichroic mirrors 903 and 904 can be relieved.

Figure 14:
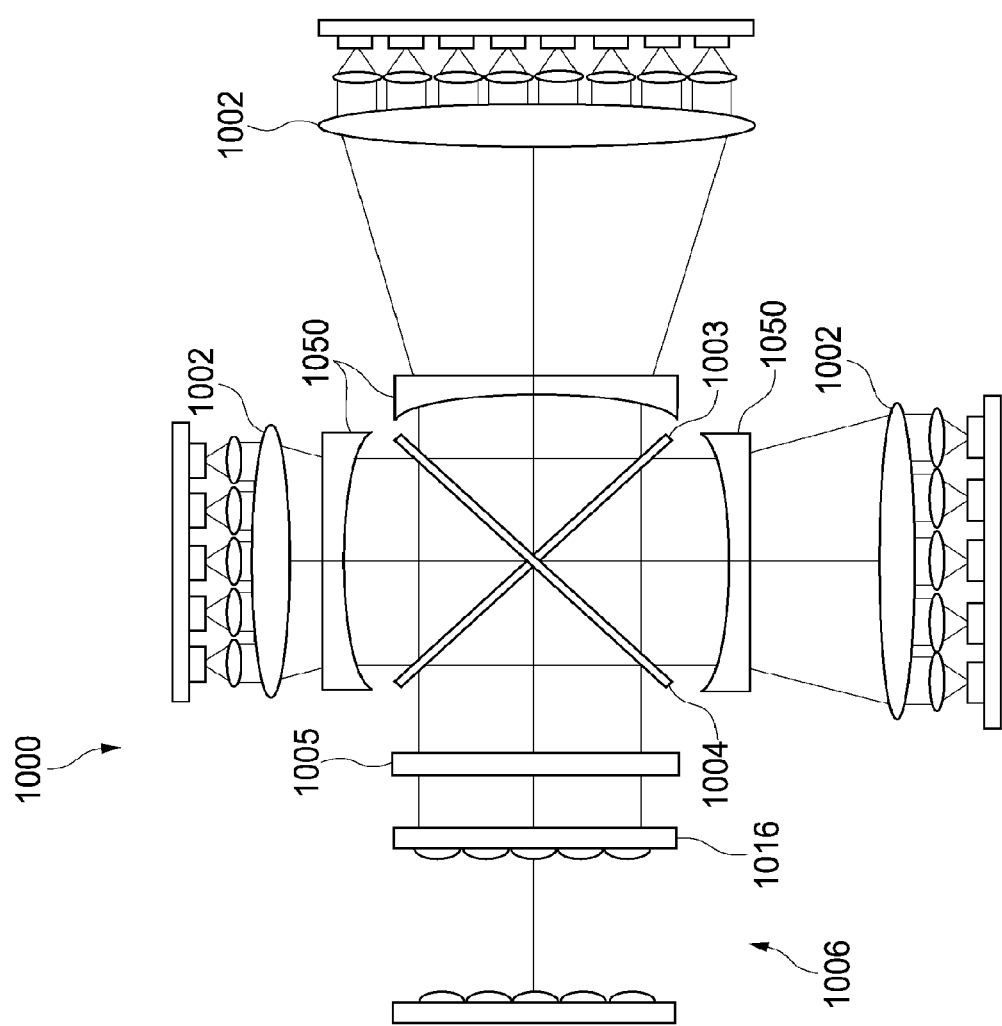
FIG. 14 A schematic diagram showing a structural example of a light source apparatus according to another embodiment.

In a light source apparatus 1000 shown in FIG. 14, concave lenses 1050 are respectively arranged between the three collective lenses 1002 and dichroic mirrors 1003 and 1004 as in the light source apparatus 900 shown in FIG. 13. On the other hand, no collective lens is provided between the dichroic mirrors 1003 and 1004 and a first fly-eye lens 1016. Moreover, a parallelization lens of an integrator optical system 1006 is also not provided. A diffuser 1005 is provided between the dichroic mirrors 1003 and 1004 and the first fly-eye lens 1016.

In this embodiment, the sizes of light fluxes of laser light of the respective colors emitted from the concave lenses 1050 are set to substantially match with a size of an effective area of the first fly-eye lens 1016. Therefore, the white light W emitted from the dichroic mirrors 1003 and 1004 is irradiated onto the first fly-eye lens 1016 as it is via the diffuser 1005. Accordingly, the size of the diffuser 1005 itself becomes large, but the total length can be shortened as compared to the light source apparatus 900 shown in FIG. 13. In other words, it becomes possible to shorten the distance between the dichroic mirrors 1003 and 1004 and the integrator optical system 1006 and thus realize a compact light source apparatus 1000.

Figure 15:
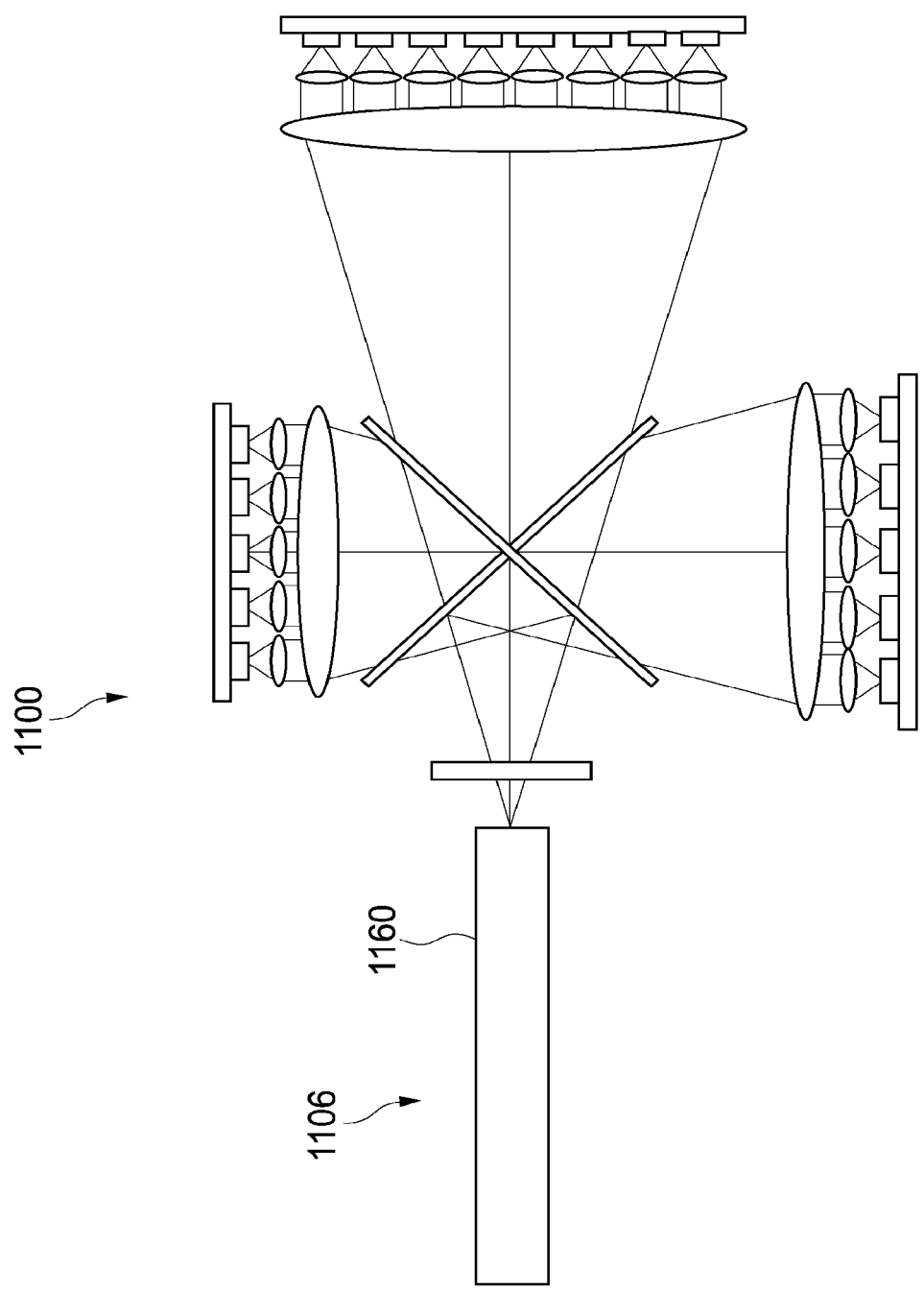
FIG. 15 A schematic diagram showing a structural example of a light source apparatus according to another embodiment.

In a light source apparatus 1100 shown in FIG. 15, a rod integrator 1160 is used as an integrator optical system 1106. Such a structure may also be adopted. By using the present technique described above also in such a structure, a compact and highly-accurate light source apparatus can be realized.

In the descriptions above, the plurality of laser light sources are arranged two-dimensionally along the two orthogonal directions. However, the plurality of laser light sources do not need to be arranged dimensionally. For example, the plurality of laser light sources may be arranged in one line along one direction.

The descriptions above have been given on the structure in which the red laser light, green laser light, and blue laser light having the same polarization direction are emitted toward the synthesis section by the first to third light source sections. Alternatively, a structure in which laser light of the respective colors that enter the integrator optical system (white light) all have the same polarization plane may be adopted as appropriate.

In the image display apparatus shown in FIG. 1, the illumination optical system structured using a transmission-type liquid crystal panel is shown. However, the illumination optical system can also be structured using a reflection-type liquid crystal panel. In addition, a digital micro-mirror device (DMD) or the like may be used as the image generation device. Furthermore, a polarization beam splitter (PBS), a color synthesis prism that synthesizes video signals of the respective colors of RGB, a TIR (Total Internal Reflection) prism, or the like may be used in place of the dichroic prism. Other structures of the image display apparatus may be set as appropriate.

Furthermore, the light source apparatus according to the present technique is also applicable to apparatuses other than the image display apparatus such as a projector.

It should be noted that the effects described in the present disclosure are mere examples and are not limited thereto, and other effects may also be obtained. The descriptions on the plurality of effects do not necessarily mean that those effects are exerted at the same time. The descriptions mean that at least one of the effects described above is obtained depending on conditions and the like, and effects not described in the present disclosure may also be obtained.

It is also possible to combine at least two of the feature portions of the embodiments described above. Specifically, the various feature portions described in the embodiments above may be combined arbitrarily irrespective of the embodiments. For example, the lens optical system including the FAC lens and the SAC lens described in the third embodiment may be used in place of a plurality of collimator lenses in other embodiments.

It should be noted that the present technique may also take the following structures.

(1) A light source apparatus, including:

a first light source section including a plurality of red laser light sources arranged in an array;

a second light source section including a plurality of green laser light sources arranged in an array;

a third light source section including a plurality of blue laser light sources arranged in an array; and a synthesis section that synthesizes red laser light emitted from the first light source section, green laser light emitted from the second light source section, and blue laser light emitted from the third light source section to generate white light.

(2) The light source apparatus according to (1), further including a diffuser that receives and diffuses the white light generated by the synthesis section.

(3) The light source apparatus according to (1) or (2), in which:

in the first light source section, the second light source section, and the third light source section, the plurality of laser light sources of the respective colors are arranged such that polarization directions of laser light to be emitted are aligned in one direction; and the first light source section, the second light source section, and the third light source section respectively emit the red laser light, the green laser light, and the blue laser light that have the same polarization direction to the synthesis section.

(4) The light source apparatus according to (3), in which:

the plurality of laser light sources of the respective colors are arranged in a first direction as a reference of the polarization direction of laser light to be emitted and a second direction orthogonal to the first direction;

the plurality of red laser light sources are arranged such that a fast axis direction of the red laser light to be emitted becomes parallel to the first direction; and the plurality of green laser light sources and the plurality of blue laser light sources are arranged such that a slow axis direction of each of the green laser light and blue laser light to be emitted becomes parallel to the first direction.

(5) The light source apparatus according to (4), in which:

each of the first light source section, the second light source section, and the third light source section includes a lens optical system capable of controlling a divergence angle of laser light emitted from the plurality of laser light sources of the respective colors in the fast axis direction and a divergence angle thereof in the slow axis direction;

the lens optical system of the first light source section is arranged while opposing the plurality of red laser light sources with a predetermined direction as a reference; and the lens optical systems of the second light source section and the third light source section are arranged while respectively opposing the plurality of green laser light sources and the plurality of blue laser light sources with a direction orthogonal to the predetermined direction as a reference.

(6) The light source apparatus according to (5), in which the lens optical system of each of the first light source section, the second light source section, and the third light source section includes a first lens section that controls the divergence angle of laser light emitted from the plurality of laser light sources of the respective colors in the fast axis direction, and a second lens section that controls the divergence angle of the laser light in the slow axis direction.

(7) The light source apparatus according to any one of (1) to (6), in which:

the first light source section includes a first collective lens that collects the red laser light emitted from the plurality of red laser light sources;

the second light source section includes a second collective lens that collects the green laser light emitted from the plurality of green laser light sources;

the third light source section includes a third collective lens that collects the blue laser light emitted from the plurality of blue laser light sources; and F numbers of the first collective lens, the second collective lens, and the third collective lens satisfy the following expression.

$$0.8 FNoG < FNoR, FNoB < 1.2 FNoG$$

FNoR: F number of first collective lens
FNoG: F number of second collective lens
FNoB: F number of third collective lens (8) The light source apparatus according to (7), in which the F numbers of the first collective lens, the second collective lens, and the third collective lens are the same.

DESCRIPTION OF SYMBOLS

R red laser light
G green laser light
B blue laser light
W white laser light
100, 600, 700, 800, 900, 1000, 1100 light source apparatus
101, 601, 701, 801 light source section
102, 602, 902, 1002 collective lens
103, 104, 603, 604, 803, 804, 903, 904, 1003, 1004 dichroic mirror
105, 905, 1005 diffuser
110, 610, 710 laser light source
111, 611 array light source
200 image generation system
210 image generation device
220 illumination optical system
400 projection system
500 image display apparatus
730 lens optical system
731 FAC lens
732 SAC lens
733, 734 cylindrical lens
1160 rod integrator

The invention claimed is:

1. A light source apparatus, comprising:
a first light source section including a plurality of red laser light sources arranged in an array;
a second light source section including a plurality of green laser light sources arranged in an array;
a third light source section including a plurality of blue laser light sources arranged in an array; and
a synthesis section that synthesizes red laser light emitted from the first light source section, green laser light emitted from the second light source section, and blue laser light emitted from the third light source section to generate white light,
wherein:
the first light source section includes a first collective lens that collects the red laser light emitted from the plurality of red laser light sources;
the second light source section includes a second collective lens that collects the green laser light emitted from the plurality of green laser light sources;
the third light source section includes a third collective lens that collects the blue laser light emitted from the plurality of blue laser light sources; and
F numbers of the first collective lens, the second collective lens, and the third collective lens are selected such that the red laser light, the green laser light and the blue laser light are collected at substantially a same position.

2. The light source apparatus according to claim 1, further comprising
a diffuser that receives and diffuses the white light generated by the synthesis section.

3. The light source apparatus according to claim 1, wherein:

in the first light source section, the second light source section, and the third light source section, the plurality of laser light sources of the respective colors are arranged such that polarization directions of laser light to be emitted are aligned in one direction; and the first light source section, the second light source section, and the third light source section respectively emit the red laser light, the green laser light, and the blue laser light that have the same polarization direction to the synthesis section.

4. The light source apparatus according to claim 3, wherein:
the plurality of laser light sources of the respective colors are arranged in a first direction as a reference of the polarization direction of laser light to be emitted and a second direction orthogonal to the first direction;
the plurality of red laser light sources are arranged such that a fast axis direction of the red laser light to be emitted becomes parallel to the first direction; and
the plurality of green laser light sources and the plurality of blue laser light sources are arranged such that a slow axis direction of each of the green laser light and blue laser light to be emitted becomes parallel to the first direction.

5. The light source apparatus according to claim 4, wherein:
each of the first light source section, the second light source section, and the third light source section includes a lens optical system capable of controlling a divergence angle of laser light emitted from the plurality of laser light sources of the respective colors in the fast axis direction and a divergence angle thereof in the slow axis direction;
the lens optical system of the first light source section is arranged while opposing the plurality of red laser light sources with a predetermined direction as a reference; and
the lens optical systems of the second light source section and the third light source section are arranged while respectively opposing the plurality of green laser light sources and the plurality of blue laser light sources with a direction orthogonal to the predetermined direction as a reference.

6. The light source apparatus according to claim 5, wherein the lens optical system of each of the first light source section, the second light source section, and the third light source section includes a first lens section that controls the divergence angle of laser light emitted from the plurality of laser light sources of the respective colors in the fast axis direction, and a second lens section that controls the divergence angle of the laser light in the slow axis direction.

7. The light source apparatus according to claim 1, wherein:
the first light source section includes a first collective lens that collects the red laser light emitted from the plurality of red laser light sources;
the second light source section includes a second collective lens that collects the green laser light emitted from the plurality of green laser light sources;
the third light source section includes a third collective lens that collects the blue laser light emitted from the plurality of blue laser light sources; and
F numbers of the first collective lens, the second collective lens, and the third collective lens satisfy the following expression $0.8 FNoG < FNoR, FNoB < 1.2 FNoG$ FNoR: F number of first collective lens
FNoG: F number of second collective lens
FNoB: F number of third collective lens.

8. The light source apparatus according to claim 7, wherein the F numbers of the first collective lens, the second collective lens, and the third collective lens are the same.

9. An image display apparatus, comprising:
(a) a light source apparatus including
a first light source section including a plurality of red laser light sources arranged in an array,
a second light source section including a plurality of green laser light sources arranged in an array,
a third light source section including a plurality of blue laser light sources arranged in an array, and
a synthesis section that synthesizes red laser light emitted from the first light source section, green laser light emitted from the second light source section, and blue laser light emitted from the third light source section to generate white light;
(b) an image generation system including
an image generation device that generates an image based on irradiated light, and
an illumination optical system that irradiates the white light emitted from the light source apparatus onto the image generation device; and
(c) a projection system that projects the image generated by the image generation device,
wherein:
the first light source section includes a first collective lens that collects the red laser light emitted from the plurality of red laser light sources;
the second light source section includes a second collective lens that collects the green laser light emitted from the plurality of green laser light sources;
the third light source section includes a third collective lens that collects the blue laser light emitted from the plurality of blue laser light sources; and
F numbers of the first collective lens, the second collective lens, and the third collective lens are selected such that the red laser light, the green laser light and the blue laser light are collected at substantially a same position.

* * * * *